Figure 1:
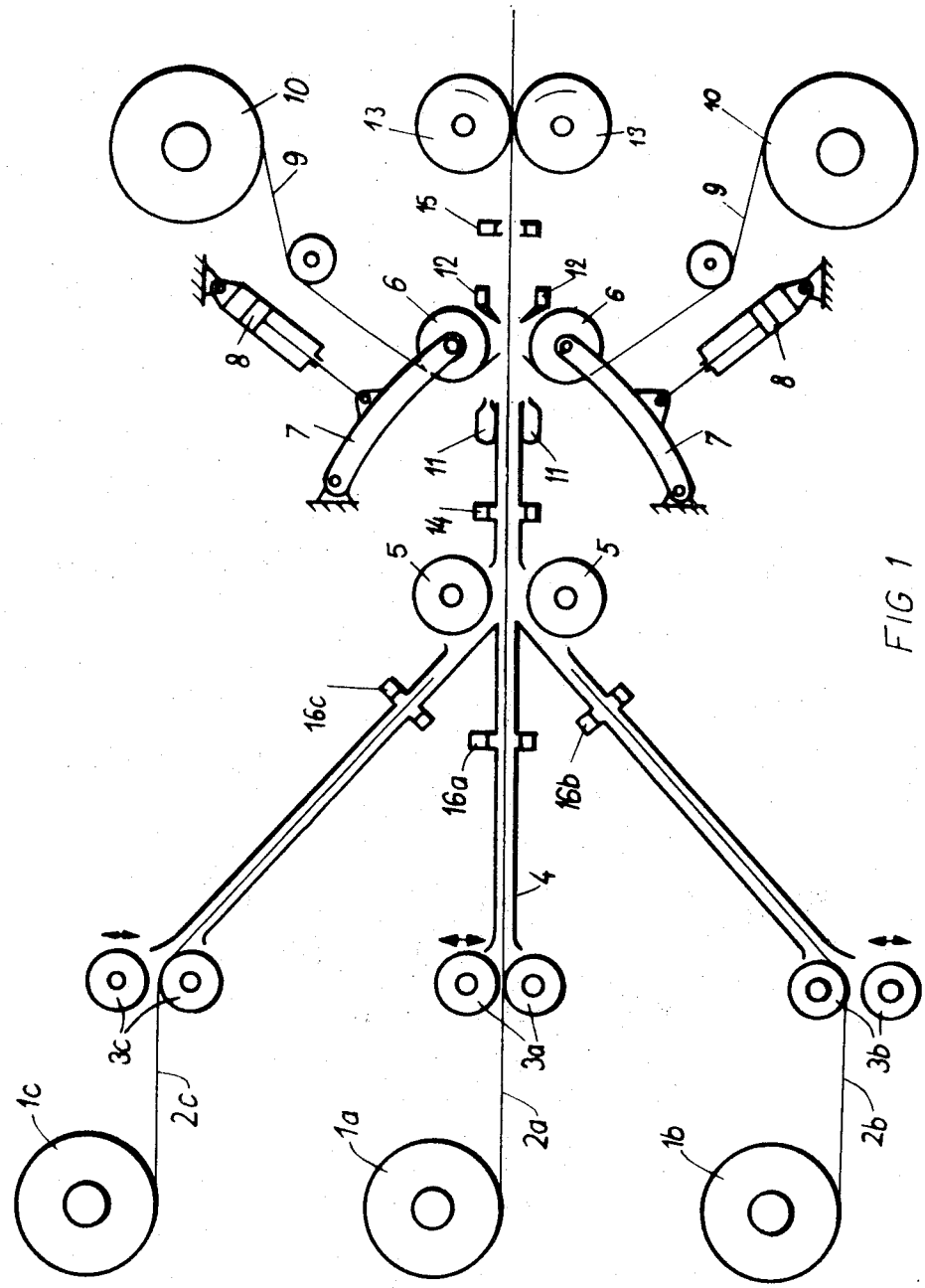

United States Patent [19]

Bruck et al.

[11] 3,873,393

[45] Mar. 25, 1975

[54] MACHINE FOR SPLICING TAPE FORM MATERIAL

[75] Inventors: Herbert Bruck, Leverkusen; Josef Busch, Bensberg-Refrath; Hans Hofmann, Cologne; Gunter Von Der Kall, Leverkusen; Fritz Kreckeler, Cologne; Hans Joachim Barke, Leverkusen, all of Germany

[73] Assignee: Agfa-Gevaert Aktiengesellschaft, Leverkusen, Germany

[22] Filed: June 11, 1973

[21] Appl. No.: 368,512

[30] Foreign Application Priority Data
June 13, 1972  Germany............................ 2228631

[52] U.S. Cl................ 156/351, 156/358, 156/497, 156/504, 156/505, 156/511, 156/516, 156/545, 156/580, 242/58.1
[51] Int. Cl....... B65h 19/18, B65h 21/00, B31f 5/06
[58] Field of Search ........... 156/351, 355, 358, 361, 156/497, 502, 504, 507, 511, 516, 527, 545, 304, 157, 505, 580; 242/58.1, 58.2, 58.3, 58.4, 58.5

[56] References Cited
UNITED STATES PATENTS

| | | | |
|---|---|---|---|
| 2,930,427 | 3/1960 | Fillmann et al.................... | 242/58.1 |
| 3,065,782 | 11/1962 | Vergobbi........................... | 242/58.4 |
| 3,514,363 | 5/1970 | Stone et al........................ | 242/58.1 |
| 3,567,534 | 3/1971 | Kushiro............................. | 156/351 |
| 3,634,170 | 1/1972 | Hottendorf....................... | 156/502 |
| 3,647,600 | 3/1972 | Vischulis et al. ................. | 156/502 |
| 3,677,864 | 7/1972 | Morse et al....................... | 156/502 |
| 3,717,057 | 2/1973 | Taklmoto.......................... | 156/502 |
| 3,728,197 | 4/1973 | Harris et al....................... | 156/157 |
| 3,745,086 | 7/1973 | Parker .............................. | 156/527 |
| 3,752,724 | 8/1973 | Seiler................................ | 156/497 |

Primary Examiner—Charles E. Van Horn
Assistant Examiner—Basil J. Lewris
Attorney, Agent, or Firm—Connolly and Hutz

[57] ABSTRACT

The new splicing machine can be used for splicing on one or both sides. Pivotal splicing rollers on which lies the end of an adhesive tape offwound from a roll are arranged above and below the tapes to be joined. The splicing rollers are followed by fixed separating means against which the adhesive tapes are drawn and thus separated on completion of the splicing operation. The splicing rollers are preceded and followed by sensors for detecting the end and beginning of tapes to be joined together. They are used for controlling the fully automatic splicing operation.

10 Claims, 3 Drawing Figures

MACHINE FOR SPLICING TAPE FORM MATERIAL

This invention relates to a machine for automatically splicing travelling tapes on one or both sides. Adhesive tape is used for joining the tapes.

Machines for continuously processing tape-form material generally require rolls of a certain length (diameter) and width. When the end of the roll is reached, a new roll has to be prepared in such a way that the beginning of the new roll and the end of the old roll can be joined together. The time available for making the joint is often short. In general, the machine should not have to be stopped for this purpose. In addition, the ends of the two tapes generally have to be spliced without overlapping because otherwise the joint would become too thick.

There are a whole number of splicing machines which incorporate storage zones for the tapes. In their case, the two tapes can be joined while stationary. Storage zones of this kind are attended by the disadvantage that the guide zone for the tapes is extremely long. In addition, they take up a considerable amount of space.

Although other splicing machines manage without storage zones, they require special cutting an trimming units for preparing the actual joint and for separating the adhesive tapes.

The object of the invention is to develop a splicing machine which, on the one hand, does not require a storage facility and, on the other hand, does not involve the use of expensive cutting and trimming units.

According to the invention, this object is achieved by virtue of the fact that a. a pivotal splicing roller, on which the end of the adhesive tape coming from a supply roll lies in readiness, is arranged above and below the tapes to be joined, b. the splicing rollers are followed in the direction of travel of the tapes by fixed separating means against which the adhesive tapes are drawn after the splicing rollers have been swung away, so that they are separated, and c. the splicing rollers are preceded and followed by sensors for detecting the end and beginning of the tapes to be joined which are in active connection with a circuit for fully automatically controlling the splicing operation.

The separating means preferably consist of heated wires. In another embodiment, the separating means consist of serrated-edge blades.

According to another aspect of the invention, the splicing rollers are preceded by air nozzles so that an airstream presses the ends of the adhesive tape against the splicing rollers.

The invention is particularly suitable for splicing tapes whose width is substantially equal to the width of the adhesive tape. In cases where it is desired to splice considerably wider tapes, several splicing machines of the kind described can readily be arranged adjacent one another transversely over the width of the tape being processed. In this case, the control circuits for the individual splicing machines are connected in parallel.

It is clear that the invention is suitable for splicing tapes on one and both sides because the entire machine is constructed in mirror symmetry to the tape. Accordingly, the only important factor is to ensure that the adhesive side of the adhesive tape runs over rollers which prevent blocking of the tape (for example Teflon rollers). In many cases, the joint also travels through zones of high moisture content in following processing stages. In this case, the adhesive side loses its adhesiveness in any event.

The advantages of the invention are embodied in particular in the versatility of the splicing machine. It can be used for overlapping joints, butt joints or even for joining two tapes with a gap in between simply by making appropriate adjustments to the sensors or to the timed sequence of the individual control systems. In many cases, it is even possible to accept a gap between the ends of the two tapes. In this case, the thickness of the joint is no greater than that of butt joints. The advantage of this method of splicing is that the tape ends do not have to be cut as exactly as they do for butt joints. For example, they can readily be cut at an angle or even torn off. The only important factor is to ensure that the adhesive tape is long enough to cover the gap between the ends of the two tapes.

Another advantage of the splicing machine according to the invention is its simple, functionally reliable structure. The simple structure of the splicing machine also enables the control functions to be completed relatively simply.

One embodiment of the invention is illustrated by way of example in the accompanying drawing and described in detail in the following.

Figure 2:
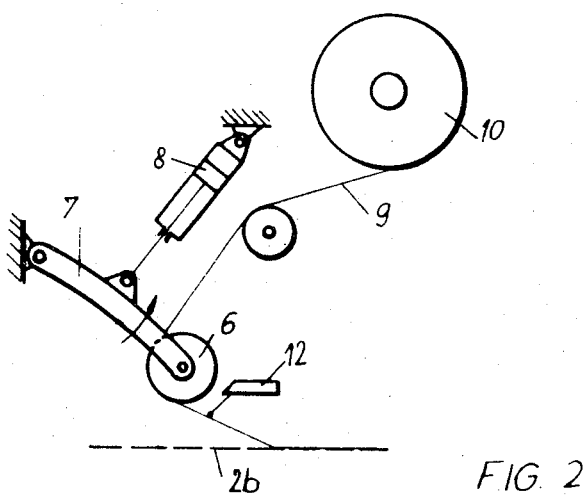
Figure 3:
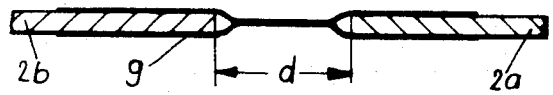

FIG. 1 diagrammatically illustrates the structure of the splicing machine in side elevation, FIG. 2 illustrates separation of the adhesive tape when the splicing rollers are swung away and FIG. 3 shows a completed joint with a gap between the two joined ends.

According to FIG. 1, the tape $2a$ offwound from the roll $1a$ travels through the pair of rollers $3a$ and the guide rail 4 between the feed rollers 5 and is then carried forward to the splicing rollers 6. The splicing rollers 6 are mounted on pivotal arms 7 actuated by hydraulic pistons 8. The adhesive tapes 9 are wound onto the rolls 10. Their ends lie in readiness on the periphery of the splicing rollers 6. A jet of air is directed onto the ends of the adhesive tape by means of the nozzles 11. In this way, they are held firmly on the splicing rollers 6.

The splicing rollers 6 are immediately followed by separating means 12 for separating the adhesive tapes on completion of splicing. These separating means consist simply of heated wires. The plastics adhesive tape melts immediately on contact with the hot wire. The advance roller 13 represent the actual tape drive. The controls of the splicing machine are of course switched off while the roll $1a$ is being offwound. In addition, the advance rollers $3a$ and the splicing rollers 6 remain swung apart from one another during this stage of the operation.

After the roll $1a$ has been emptied, the end of the tape $2a$ is joined to the beginning of the tape $2b$ wound onto the roll $1b$.

The splicing operation is described in detail in the following. When the end of the tape $2a$ reaches the sensor 14, the advance drive $3b$ for the tape $2b$ is switched on by pivoting the lower roller upwards. The tape $2b$, whose beginning lies in readiness just in front of the rollers 5, then begins to move forward. It follows the end of the tape from roll $1a$ at a certain distance. Through the sensor 14 the splicing rolls 6, on which lies the beginning of the adhesive tape 9, are then brought into their contact position. It is now that the actual splicing operation begins. The tape 1a picks up the adhesive tapes 9 offwound from the rolls 10. In this way, the adhesive tapes 9 are applied to both sides of the tape 1a. After the end of the tape from roll 1a has passed the splicing rollers, the two adhesive tapes 9 are stuck to one another over a certain distance. This distance corresponds in length to the interval between the tapes 2a and 2b. The sensor 15 then indicates the beginning of the tape from roll 1b and releases the signals by which the splicing operation is terminated. The two splicing rollers 6 swing away, as a result of which the adhesive tapes 9 are partly detached from the tape 2b and are drawn against the heated wires 12 where they are immediately melted. The detached ends of the adhesive tapes are reapplied to the tape 2b by the advance rollers 13. The next splicing operation is initiated when the end of the tape from roll 1b moves past the sensor 14. For this purpose, the beginning of a new roll of tape 1a is introduced. Accordingly, the two rolls 1a and 1b alternate with one another. Finally, a replacement roll 1c is provided. However, it is only used when the empty roll 1a or 1b has inadvertently not been replaced by a new roll or when it is desired to affix a totally different material (for example leader tape). The advance drive and the guide rail for this tape are exactly the same as for the tapes 1a and 1b.

After a new roll 1a or 1b has been installed, the beginning of the tape is pushed between the rollers 3a or 3b. These rollers are then swung towards one another and the beginning of the tape travels up to the sensor 16a or 16b where it lies in readiness for the beginning of the splicing operation. A safety circuit ensures that the machine is switched off when the end of the travelling tape passes the sensors before a replacement roll has been installed.

It is of course also possible to work with more than three rolls of tape. In this case, the control circuits have to be designed in such a way that the tape drives are switched on according to the required roll sequence.

The sensors 14, 15 and 16a, 16b are pneumatic sensors or photo elements (photo cells).

FIG. 2 shows the splicing machine on a larger scale. The separating means 12 has just come into operation in the illustrated position of the splicing roll 6. The splicing roll 6 is swung away. It can be seen that the adhesive tape 9 has detached itself from the tape 2b and is being drawn against the hot wire 12 where it immediately melts.

FIG. 3 is a cross-section through a double-sided joint with a gap d. The adhesive tapes 9 are applied to one another over the distance d. Accordingly, no tacky surface is exposed in the completed joint.

We claim:

1. An apparatus for splicing the trailing and leading ends of travelling tapes following each other in a predetermined path by applying pieces of adhesive tape having a travelling tape-securing adhesively-coated side to the contiguous trailing and leading ends of the travelling tapes comprising a splicing presser disposed on a side of the path of the travelling tapes, an adhesive tape supply mounted adjacent the splicing presser for supplying adhesive tape to the splicing presser with the travelling tape-securing adhesively coated side disposed remotely from the contacted surface of the splicing presser, means to hold the adhesive tape in contact with the splicing presser with the tip portion of the adhesive tape fed past the splicing presser and extending outwardly from the splicing presser, the splicing presser being mounted on a movable arm for movement toward and away from the path of the travelling tapes, a drive connected to the movable arm for actuating the movement of the arm, a control system including sensors for detecting the trailing and leading ends of the travelling tapes to be spliced to each other, the control circuit connecting the sensors to the drive for actuating the movement of the splicing presser toward and away from the path of the travelling tapes just before the trailing end of the leading tape and after the leading end of the following tape respectively, a severing element disposed adjacent the path of the travelling tapes and in the path of a piece of adhesive tape, whereby said adhesive tape is adhered to the trailing end of the leading tape and the leading end of the following tape of the travelling tapes by movement of the splicing presser toward the travelling tapes and the piece of adhesive tape adhered to the travelling tapes is severed from the bulk of the adhesive tape on the adhesive tape supply by being drawn against the severing means by movement of the splicing presser away from the travelling tapes thereby leaving a tip portion of adhesive tape extending from the splicing presser for attachment to the next trailing end of the travelling tape.

2. An apparatus as set forth in claim 1 wherein the severing means comprises stationary element which is constructed and arranged to sever the adhesive tape when the tape is in contact with the severing element.

3. An apparatus as set forth in claim 2 wherein the severing element comprises a thin heated element.

4. An apparatus as set forth in claim 2 wherein the severing element comprises a sharp blade.

5. An apparatus as set forth in claim 4 wherein the sharp blade comprises a serrated blade.

6. An apparatus as set forth in claim 1 wherein a pair of splicing pressers and associated severing means, sensors and movable arm are disposed on opposite sides of the travelling tapes.

7. An apparatus as set forth in claim 1 wherein the splicing presser comprises a splicing roller.

8. An apparatus as set forth in claim 7 wherein the adhesive tape is bent a sufficient amount around the splicing roller to maintain it in position to contact the travelling tapes when the splicing roller is moved towards the travelling tapes.

9. An apparatus as set forth in claim 8 wherein the means to hold the adhesive tape in contact with the splicing presser comprises air nozzles positioned adjacent the path of the travelling tapes for directing a stream of air against the adhesive tape on the splicing presser so as to maintain the adhesive tape in contact with the splicing presser with its tip extended towards the travelling tapes.

10. An apparatus as set forth in claim 1 wherein the movable arm comprises a pivoted arm.

* * * * *